(12) United States Patent
Hatakeyama et al.

(10) Patent No.: US 11,114,970 B2
(45) Date of Patent: Sep. 7, 2021

(54) MOTOR DRIVER, HEAT PUMP SYSTEM AND REFRIGERATION AND AIR CONDITIONING EQUIPMENT USING MOTOR DRIVER

(71) Applicant: Mitsubishi Electric Corporation, Tokyo (JP)

(72) Inventors: Kazunori Hatakeyama, Tokyo (JP); Keisuke Uemura, Tokyo (JP); Yosuke Shinomoto, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/614,193

(22) PCT Filed: Jul. 19, 2017

(86) PCT No.: PCT/JP2017/026148
§ 371 (c)(1),
(2) Date: Nov. 15, 2019

(87) PCT Pub. No.: WO2019/016901
PCT Pub. Date: Jan. 24, 2019

(65) Prior Publication Data
US 2020/0403548 A1    Dec. 24, 2020

(51) Int. Cl.
*H02P 6/06*  (2006.01)
*H02P 27/08*  (2006.01)

(52) U.S. Cl.
CPC ................ *H02P 27/085* (2013.01)

(58) Field of Classification Search
CPC .......... F04B 49/06; H02P 27/085; H02P 6/06; H02M 7/538466
See application file for complete search history.

(56) References Cited

U.S. PATENT DOCUMENTS

| 10,581,365 B2 | 3/2020 | Hatakeyama et al. |
| 2004/0207360 A1 | 10/2004 | Matsuhiro et al. |

(Continued)

FOREIGN PATENT DOCUMENTS

| JP | S60-174088 A | 9/1985 |
| JP | H02-151295 A | 6/1990 |

(Continued)

OTHER PUBLICATIONS

International Search Report of the International Searching Authority dated Oct. 3, 2017 for the corresponding International application No. PCT/JP2017/026148 (and English translation).

(Continued)

*Primary Examiner* — Cortez M Cook
(74) *Attorney, Agent, or Firm* — Posz Law Group, PLC (57) ABSTRACT

A motor driver includes an inverter used for driving a motor and configured to apply an alternating-current voltage to the motor. The inverter drives, during start operation, a switching element of the inverter with a first PWM signal that is PWM modulated with a carrier frequency that is a first integer multiple of a frequency of the alternating-current voltage, and thereafter drives the switching element with a second PWM signal that is PWM modulated with a carrier frequency that is a second integer multiple of the frequency of the alternating-current voltage. The second integer is smaller than the first integer.

24 Claims, 10 Drawing Sheets

FIG.1

(56) References Cited

U.S. PATENT DOCUMENTS

| | | | |
|---|---|---|---|
| 2008/0134702 A1* | 6/2008 | Ishikawa | F04B 49/06 |
| | | | 62/228.4 |
| 2009/0058331 A1 | 3/2009 | Aoyagi et al. | |
| 2010/0027979 A1* | 2/2010 | Matsunaga | H02P 6/06 |
| | | | 388/811 |
| 2010/0250067 A1* | 9/2010 | Matsumura | H02P 21/16 |
| | | | 701/41 |
| 2018/0219508 A1 | 8/2018 | Arisawa et al. | |
| 2018/0226913 A1* | 8/2018 | Hatakeyama | H02M 7/538466 |
| 2018/0245831 A1 | 8/2018 | Uemura et al. | |

FOREIGN PATENT DOCUMENTS

| | | |
|---|---|---|
| JP | 2004-289985 A | 10/2004 |
| JP | 2009-055693 A | 3/2009 |
| WO | 2017/026061 A1 | 2/2017 |
| WO | 2017/037791 A1 | 3/2017 |
| WO | 2017/037941 A1 | 3/2017 |
| WO | 2017/077599 A1 | 5/2017 |

OTHER PUBLICATIONS

Extended European Search Report dated Apr. 2, 2020 issued in corresponding EP patent application No. 17918573.1.
European Office Action dated Jun. 9, 2021, issued in corresponding European Patent Application No. 17918573.1.

\* cited by examiner

MOTOR DRIVER, HEAT PUMP SYSTEM AND REFRIGERATION AND AIR CONDITIONING EQUIPMENT USING MOTOR DRIVER

CROSS REFERENCE TO RELATED APPLICATION

This application is a U.S. national stage application of International Patent Application No. PCT/JP2017/026148 filed on Jul. 19, 2017, the disclosure of which is incorporated herein by reference.

TECHNICAL FIELD

The present invention relates to a motor driver that drives a motor, a heat pump system and refrigeration and air conditioning equipment that use the motor driver.

BACKGROUND

For reducing switching loss in an inverter controller for driving a motor, there is a technology of selecting two-phase modulation in a normal operation region in which a speed command is small, and setting a low carrier frequency (refer to Patent Literature 1 below, for example).

There is also a technology for detecting, in a power converting device that drives a motor, the direct-current bus current of a power converter by using a current detector that is one shunt resistor, and lowering the carrier frequency and widening the current flow width to facilitate current detection as a measure against generation of "ringing" associated with switching (refer to Patent Literature 2, for example).

Non Patent Literature 1 below is a known document relating to an interior magnet synchronous motor. Non Patent Literature 1 will be mentioned in the "Description of Embodiments".

PATENT LITERATURE

Patent Literature 1: Japanese Patent Application Laid-open No. 2004-289985
Patent Literature 2: Japanese Patent Application Laid-open No. 2009-055693

NON PATENT LITERATURE

Non Patent Literature 1: Design and Control of Interior Permanent Magnet Synchronous Motor (in Japanese), Oct. 25, 2001, Ohmsha According to the technology described in Patent Literature 1 mentioned above, when a low carrier frequency is set in two-phase modulation, the frequency of voltage output from the inverter becomes close to the carrier frequency. Thus, in a case where the carrier frequency and the frequency of the output voltage are not synchronous, the symmetry of the waveform of the output voltage is lost, and noise and vibration may be caused in the motor due to output voltage distortion.

According to the technology described in Patent Literature 2 mentioned above, in a case where the carrier frequency and the frequency of the output voltage are not synchronous, the symmetry of the waveform of the output voltage is lost, distortion of the output voltage causes distortion of the waveform of current, which is a problem in that the current cannot be stably detected and that stable driving of the motor is difficult.

SUMMARY

The present invention has been made in view of the above, and an object thereof is to provide a motor driver capable of achieving, even in a state in which a carrier frequency is lowered, both of more stable driving of a motor with reduced noise and vibration, and lower noise resulting from the lowered carrier frequency, and a heat pump system and refrigeration and air conditioning equipment that use the motor driver.

To solve the aforementioned problems and achieve the object, a motor driver according to the present invention includes an inverter used for driving a motor and configured to apply an alternating-current voltage to the motor. The inverter drives, during start operation, a switching element of the inverter with a first PWM signal that is PWM modulated with a carrier frequency that is a first integer multiple of a frequency of the alternating-current voltage, and thereafter drives the switching element with a second PWM signal that is PWM modulated with a carrier frequency that is a second integer multiple of the frequency of the alternating-current voltage. The second integer is smaller than the first integer.

According to the present invention, an effect of achieving, even in a state in which a carrier frequency is lowered, both of more stable driving of the motor with reduced noise and vibration, and lower noise resulting from the lowered carrier frequency.

DETAILED DESCRIPTION

Figure 1:
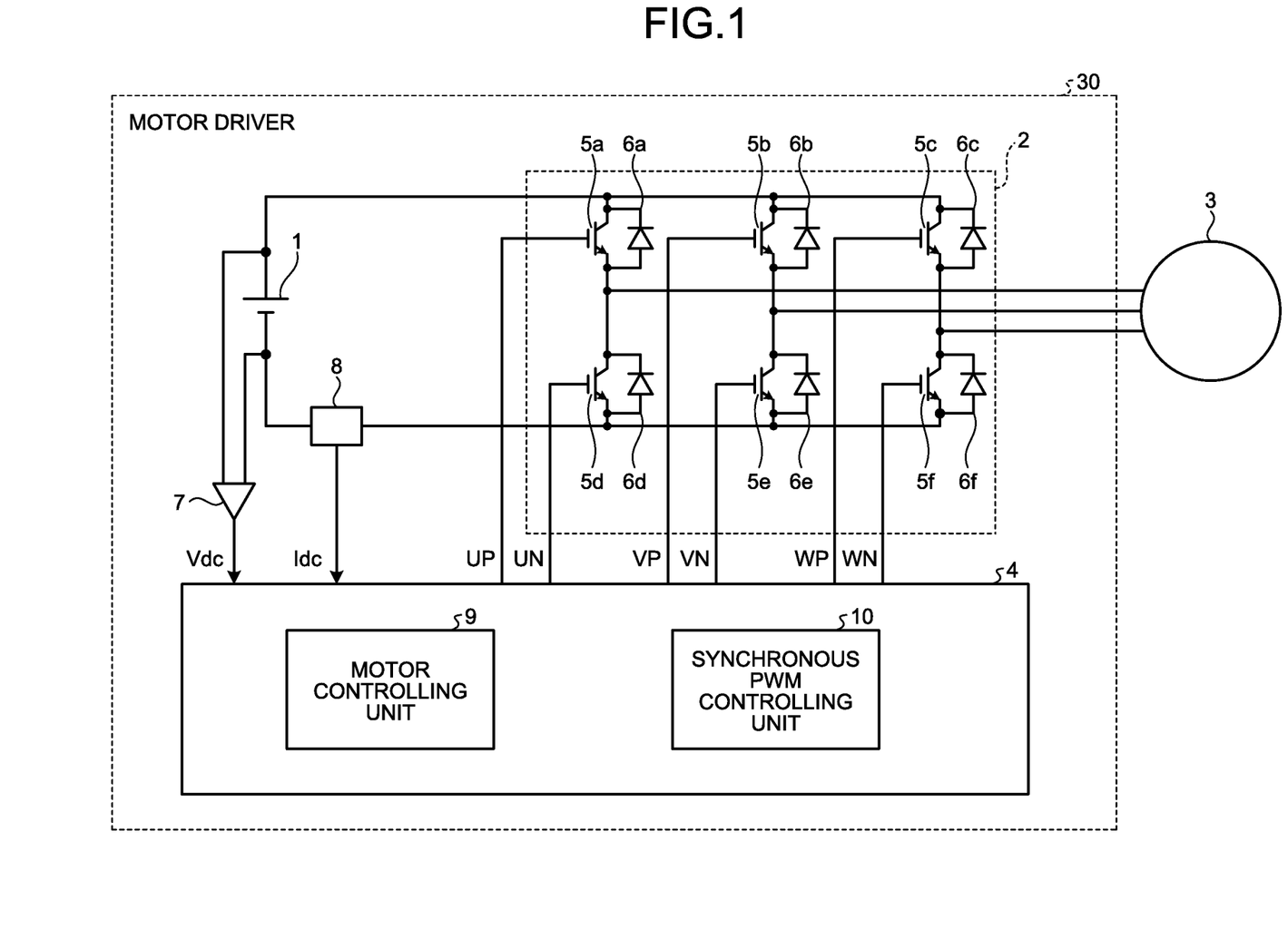
FIG. 1 is a circuit diagram illustrating a configuration of a motor driver according to the present embodiment.

First, a basic configuration and operation of a motor driver according to the present embodiment will be described. FIG. 1 is a circuit diagram illustrating a configuration of a motor driver 30 according to the present embodiment. As illustrated in FIG. 1, the motor driver 30 according to the present embodiment is a device that supplies alternating-current power to a motor 3, which is an alternating-current motor, to drive the rotation of the motor 3. The motor driver 30 includes a direct-current power supply 1 that is a supply source of direct-current power, an inverter 2 that converts the direct current into alternating current and applies alternating-current voltage to the motor 3, and an inverter controlling unit 4 that controls the inverter 2.

In the motor driver 30 illustrated in FIG. 1, the inverter 2 includes switching elements 5a to 5f, and diodes 6a to 6f connected in parallel with the switching elements 5a to 5f. The inverter 2 is provided with a direct-current voltage detecting unit 7 that detects the voltage of the direct-current power supply 1, and a current detector 8 that detects the current flowing through the inverter 2. The inverter controlling unit 4 generates pulse width modulation (hereinafter referred to as "PWM") signals UP, VP, WP, UN, VN, and WN on the basis of the voltage Vdc detected by the direct-current voltage detecting unit 7 and the current Idc detected by the current detector 8. The inverter controlling unit 4 outputs the generated PWM signals UP, VP, WP, UN, VN, and WN to the inverter 2 to drive the switching elements 5a to 5f. The inverter 2 controlled by the PWM signals UP, VP, WP, UN, VN, and WN applies an alternating-current voltage as commanded to the motor 3.

Note that the direct-current power supply 1 may be a direct-current power supply generated by rectifying an alternating-current power supply with a diode bridge or the like and further smoothing the rectified power, or may be a direct-current power supply typified by a solar cell, a battery, and the like.

While the current detector 8 is provided on an input side of the inverter 2, the current detector 8 may be provided between the inverter 2 and the motor 3 and detect phase currents Iu, Iv, and Iw flowing through a U phase, a V phase, and a W phase (hereinafter also referred to as "UVW phases" where necessary) that are the phases of the motor 3. The current detector 8 may be provided on a negative electrode side of the switching elements 5d to 5f and detect the currents Iu, Iv, and Iw flowing through the phases of the motor 3. Thus, any means or method capable of detecting the phase currents Iu, Iv, and Iw flowing through the phases of the motor 3 may be used.

The description refers back to FIG. 1, in which the inverter controlling unit 4 includes: a motor controlling unit 9 that computes voltage commands Vu*, Vv*, and Vw* and a phase angle (hereinafter referred to as "voltage phase" where necessary) θv of the voltage commands Vu*, Vv*, and Vw* on the basis of the voltage Vdc detected by the direct-current voltage detecting unit 7 and the current Idc detected by the current detector 8; and a synchronous PWM controlling unit 10 that generates PWM signals UP, VP, WP, UN, VN, and WN by using the voltage commands Vu*, Vv*, and Vw* and the voltage phase θv. Hereinafter, configurations and operations of the motor controlling unit 9 and the synchronous PWM controlling unit 10 will be described.

Figure 2:
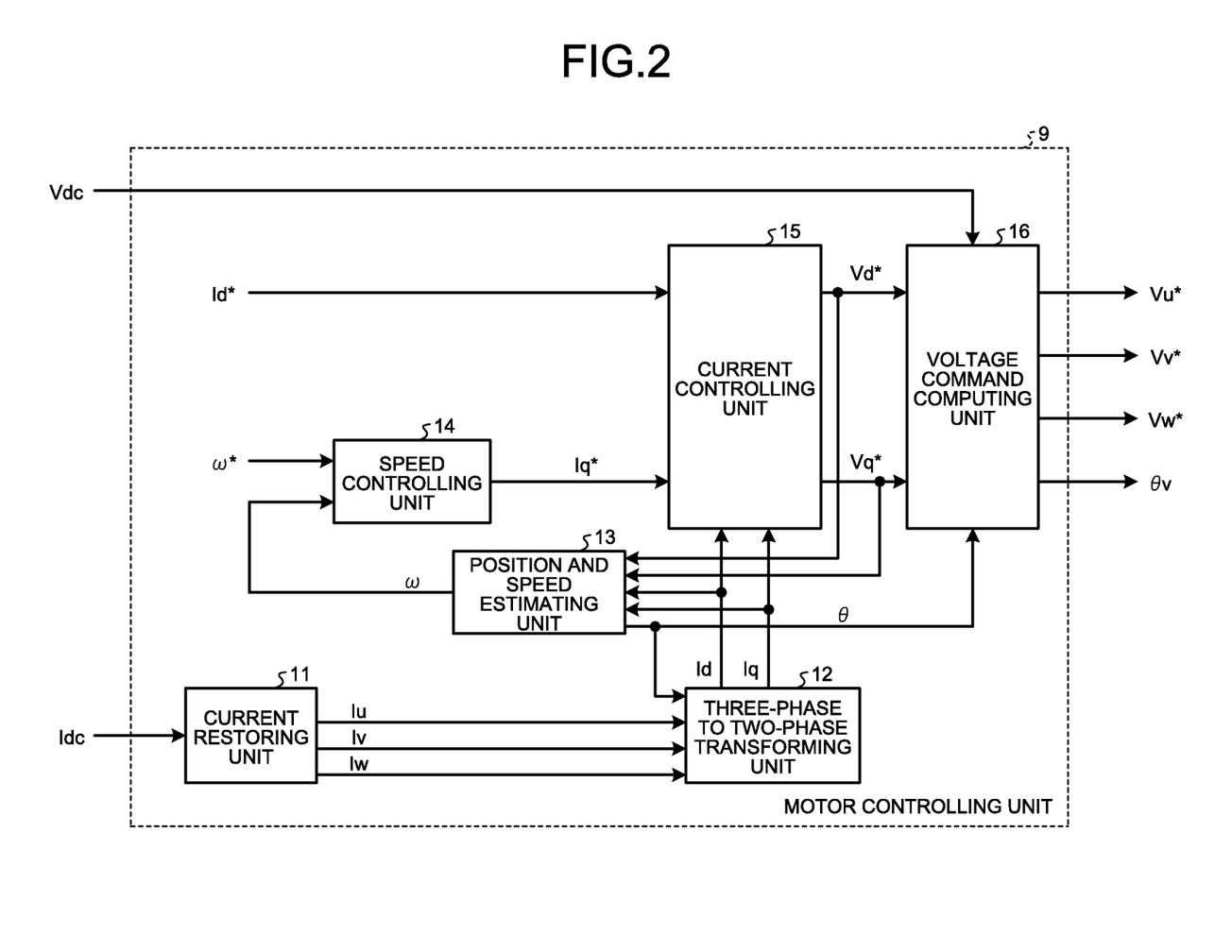
FIG. 2 is a block diagram illustrating a configuration of a motor controlling unit according to the present embodiment.
Figure 3:
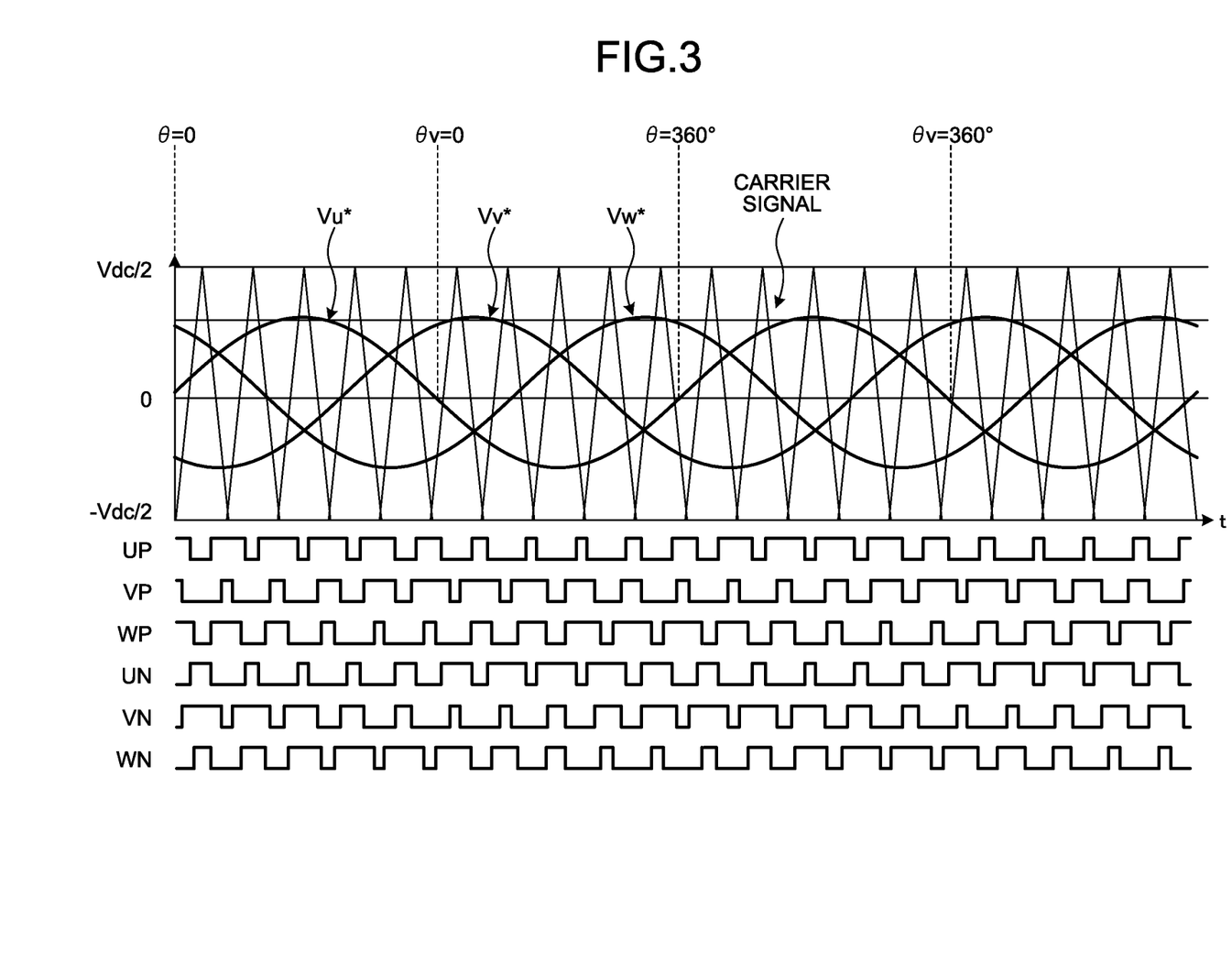
FIG. 3 is a waveform chart for explaining operation of the motor controlling unit according to the present embodiment.

FIG. 2 is a block diagram illustrating a configuration of the motor controlling unit 9 according to the present embodiment. FIG. 3 is a waveform chart for explaining the operation of the motor controlling unit 9 according to the present embodiment.

In FIG. 2, a current restoring unit 11 restores the phase currents Iu, Iv, and Iw flowing through the motor 3 from information of an output Idc of the current detector 8. Note that the restoration by the current restoring unit 11 is unnecessary when the phase currents Iu, Iv, and Iw flowing through the motor 3 are detected directly.

A three-phase to two-phase transforming unit 12 generates currents Id and Iq on dq coordinate axes, that is, a d-axis current on a d-axis coordinate and a q-axis current on a q-axis coordinate by coordinate transformation on the basis of the restored Iu, Iv, and Iw and a rotor magnetic pole position θ of the motor 3, and outputs the generated currents Id and Iq to a position and speed estimating unit 13, and a current controlling unit 15. Note that the rotor magnetic pole position θ is generated by the position and speed estimating unit 13.

The position and speed estimating unit 13 generates a speed estimation value ω of the motor 3 on the basis of the currents Id and Iq and voltage commands Vd* and Vq*, and outputs the speed estimation value ω to a speed controlling unit 14. Note that the voltage commands Vd* and Vq* are generated by the current controlling unit 15.

The speed controlling unit 14 calculates a q-axis current command Iq* so that the speed estimation value ω agrees with a speed command value ω* on the basis of the speed command value ω* and the speed estimation value ω, and outputs the calculated q-axis current command Iq* to the current controlling unit 15.

The current controlling unit 15 generates a d-axis voltage command Vd* so that the d-axis current Id agrees with a d-axis current command Id*, and a q-axis voltage command Vq* so that the q-axis current Iq agrees with the q-axis current command Iq*, and outputs the d-axis voltage command Vd* and the q-axis voltage command Vq* to a voltage command computing unit 16.

The voltage command computing unit 16 generates: voltage commands Vu*, Vv*, and Vw* of the UVW phases, that is, a U-phase voltage command Vu*, a V-phase voltage command Vv*, and a W-phase voltage command Vw*, and a voltage phase θv; on the basis of the voltage Vdc detected by the direct-current voltage detecting unit 7, the d-axis voltage command Vd*, the q-axis voltage command Vq*, and the rotor magnetic pole position θ; and outputs the voltage commands Vu*, Vv*, and Vw* to the synchronous PWM controlling unit 10. Note that the motor controlling unit 9 is known as described in Non Patent Literature 1, and detailed description thereof will thus be omitted herein. In addition, needless to say, any method of a control technology capable of driving the motor 3 may be employed.

Upper part of FIG. 3 illustrates an example of the voltage commands Vu*, Vv*, and Vw* of the UVW phases generated by the voltage command computing unit 16. A carrier signal expressed by a triangular wave and the voltage commands Vu*, Vv*, and Vw* are compared with each other by the synchronous PWM controlling unit 10, and PWM signals UP, VP, WP, UN, VN, and WN illustrated in lower part are generated. Note that a specific method for generating the PWM signals UP, VP, WP, UN, VN, and WN will be described later. In addition, while a zero crossing point at which the U-phase voltage command Vu* falls is a reference point of the voltage phase θv=0 in the example of FIG. 3, the reference point is not limited thereto, and any point may be the reference point of θv=0.

Figure 4:
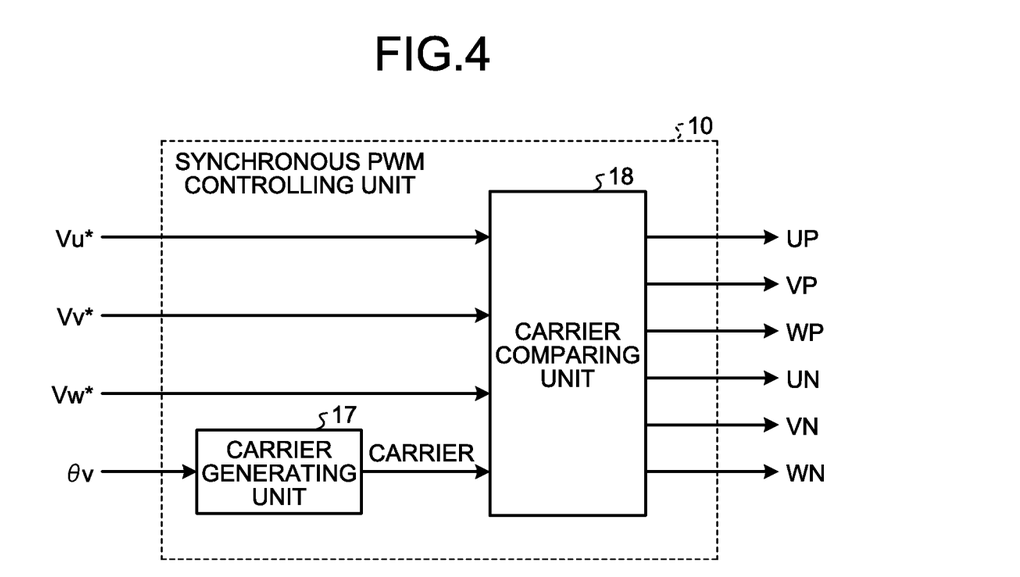
FIG. 4 is a block diagram illustrating a configuration of a synchronous PWM controlling unit according to the present embodiment.

FIG. 4 is a block diagram illustrating a configuration of the synchronous PWM controlling unit 10 according to the present embodiment. As illustrated in FIG. 4, the synchronous PWM controlling unit 10 includes a carrier generating unit 17 and a carrier comparing unit 18. The carrier generating unit 17 generates a carrier on the basis of the voltage phase θv. The carrier comparing unit 18 generates PWM signals UP, VP, WP, UN, VN, and WN on the basis of the carrier signal and the voltage commands Vu*, Vv*, and Vw*.

Figure 5:
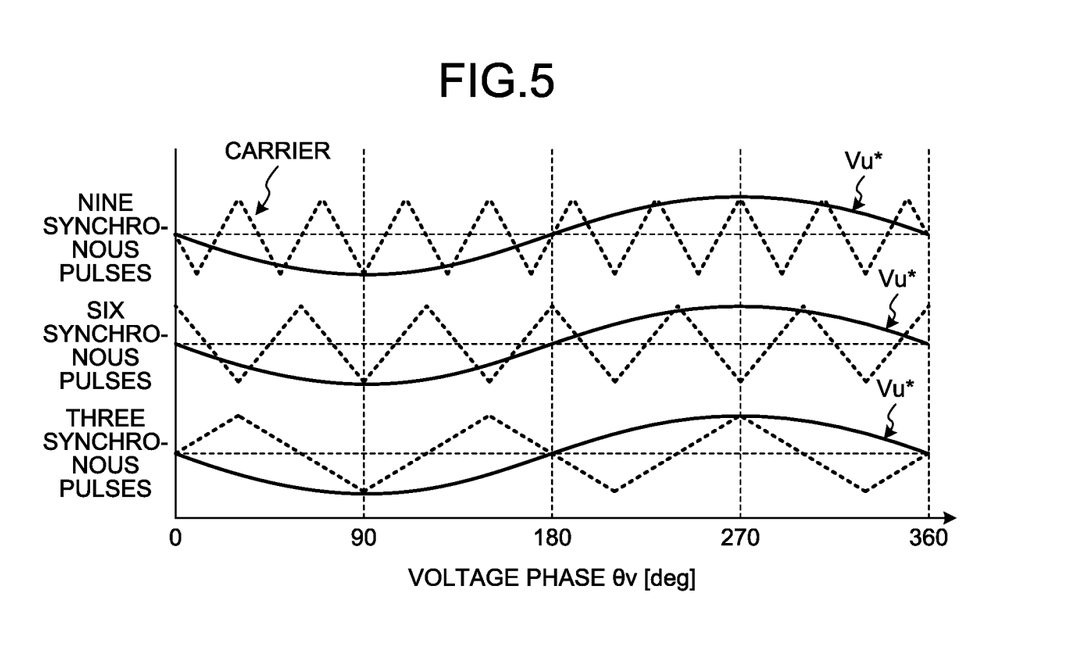
FIG. 5 is a waveform chart illustrating a relation between a voltage command Vu* and a carrier according to the present embodiment.

FIG. 5 is a waveform chart illustrating a relation between the voltage command Vu* and the carrier in the present embodiment, in which the horizontal axis represents the voltage phase θv, and the vertical axis represents a waveform of the carrier and a waveform of the voltage command Vu* when control is performed with three synchronous pulses, those waveforms when control is performed with six synchronous pulses, and those waveforms when control is performed with nine synchronous pulses, in this order from the bottom.

In the case of synchronous PWM control, the generated carrier is synchronous with the voltage phase θv as illustrated in FIG. 5. Specifically, the carrier generating unit 17 generates a carrier that is synchronous with the voltage phase θv. In this case, the carrier comparing unit 18 compares the magnitude of the carrier with that of the voltage command Vu*, and outputs a PWM signal of "high" or "low". Note that an example of PWM signals is as illustrated in the lower part of FIG. 3.

The synchronous PWM controlling unit 10 performs control so that the carrier frequency that is the frequency of the carrier of a triangular wave is three times, six times, and nine times the frequency of the U-phase voltage command Vu*. When the carrier frequency is changed to three times, six times, and nine times, PWM signals with the number of pulses included in half the cycle of the carrier being three, six and nine, respectively, are generated. Because the carrier and the voltage phase θv are synchronous, the pulses are called "three synchronous pulses", "six synchronous pulses", "nine synchronous pulses". Although not illustrated in FIG. 5, the carrier frequency can be set to be higher than nine times, that is, control can be performed so that the frequency of a PWM signal is 3n times (n is an integer) the frequency of the alternating-current voltage. As the number of pulses of a PWM signal with respect to one cycle of the voltage command Vu* increases, the accuracy of output voltage increases, however the number of times of switching of the switching elements 5a to 5f increases. In other words, an increase in the carrier frequency leads to an increase in switching loss, and an increase in the carrier frequency and an increase in the switching loss are in the relation of trade-off.

Figure 6:
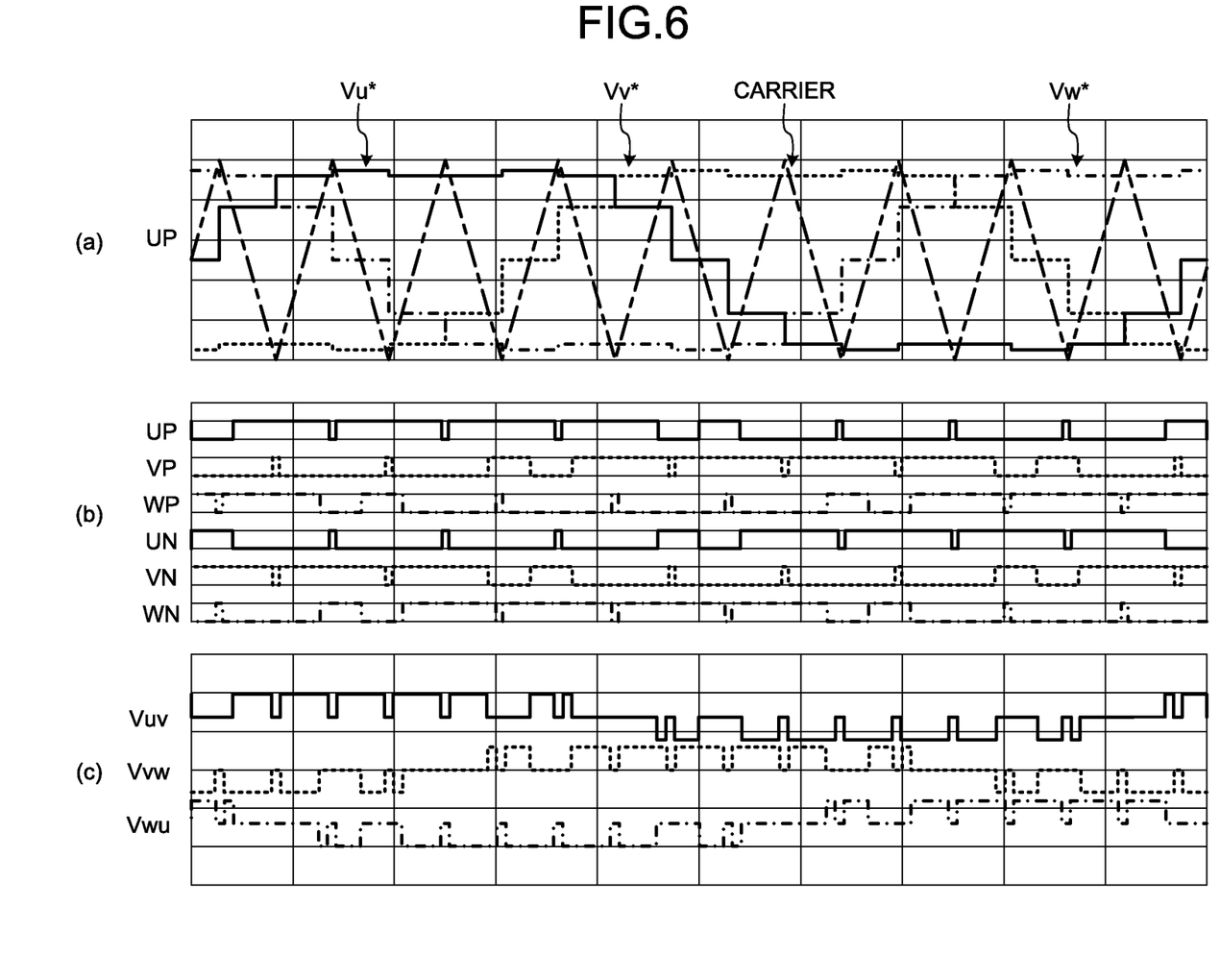
FIG. 6 illustrates waveform charts of operating waveforms of the carrier, voltage commands, PWM signals, and line voltages applied to a motor, when being operated with nine pulses.

FIG. 6 illustrates waveform charts of operating waveforms of: the carrier; the voltage commands Vu*, Vv*, and Vw*; the PWM signals UP, VP, WP, UN, VN, and WN; and line voltages Vuv, Vvw, and Vwu applied to the motor 3, when being operated with nine pulses. Note that, in FIG. 6, operation in a case of using a microcomputer that is used in actually implementing the inverter controlling unit 4 is assumed. Thus, while the voltage command Vu* operates continuously in FIG. 3, the voltage command Vu* operates to discretely change because control is performed at the timing of the peaks (tops) and the valleys (bottoms) of the carrier in FIG. 6.

The waveform illustrated in FIG. 6 (a) is set so that nine cycles of the carrier are included in one cycle of the voltage command Vu*. When the voltage command Vu* is higher than the carrier as a result of the comparison in magnitude between the carrier and the voltage command Vu*, the PWM signal UP is output at the high level, and when the voltage command Vu* is lower than the carrier, the PWM signal UP is output at the low level, for example. The PWM signal UN is controlled to be opposite to the PWM signal UP. Similarly, the magnitudes of the carrier and each of the voltage commands Vv* and Vw* are compared, and the PWM signals VP, WP, VN, and WN as illustrated in FIG. 6 (b) are generated on the basis of the results of comparison. The switching elements 5a to 5f are driven by the generated PWM signals, and the line voltages Vuv, Vvw, and Vwu as illustrated in FIG. 6 (c) are voltages to be applied to the motor 3.

Recently, in order to improve output voltages in driving a motor, such techniques as the space vector modulation PWM and the third-order harmonics superposition PWM have also been widely used. Thus, while the voltage command Vu* is regarded as a sine wave in FIGS. 3 and 5, the waveforms of the voltage commands Vu*, Vv*, and Vw* are based on the space vector modulation PWM and the third-order harmonics superposition PWM in the present embodiment as expressed by solid lines, broken lines, and alternate long and short dash lines in FIG. 6 (a). With reference to the waveforms in FIG. 6 (b) and FIG. 6 (c), waveforms equivalent to those in the lower part of FIG. 3 are generated, and it is clear that discretely changing voltage commands may be used to generate voltage the commands Vu*, Vv*, and Vw*.

Note that, as illustrated in FIG. 6, an operation set so that nine cycles of the carrier are included in one cycle of the voltage command Vu* will be considered. First, as the rotation speed of the motor 3 increases, the frequency of the voltage command Vu* increases accordingly. Thus, the operation set so that nine cycles of the carrier are included means that the carrier frequency is varied with the rotation speed of the motor 3.

Figure 7:
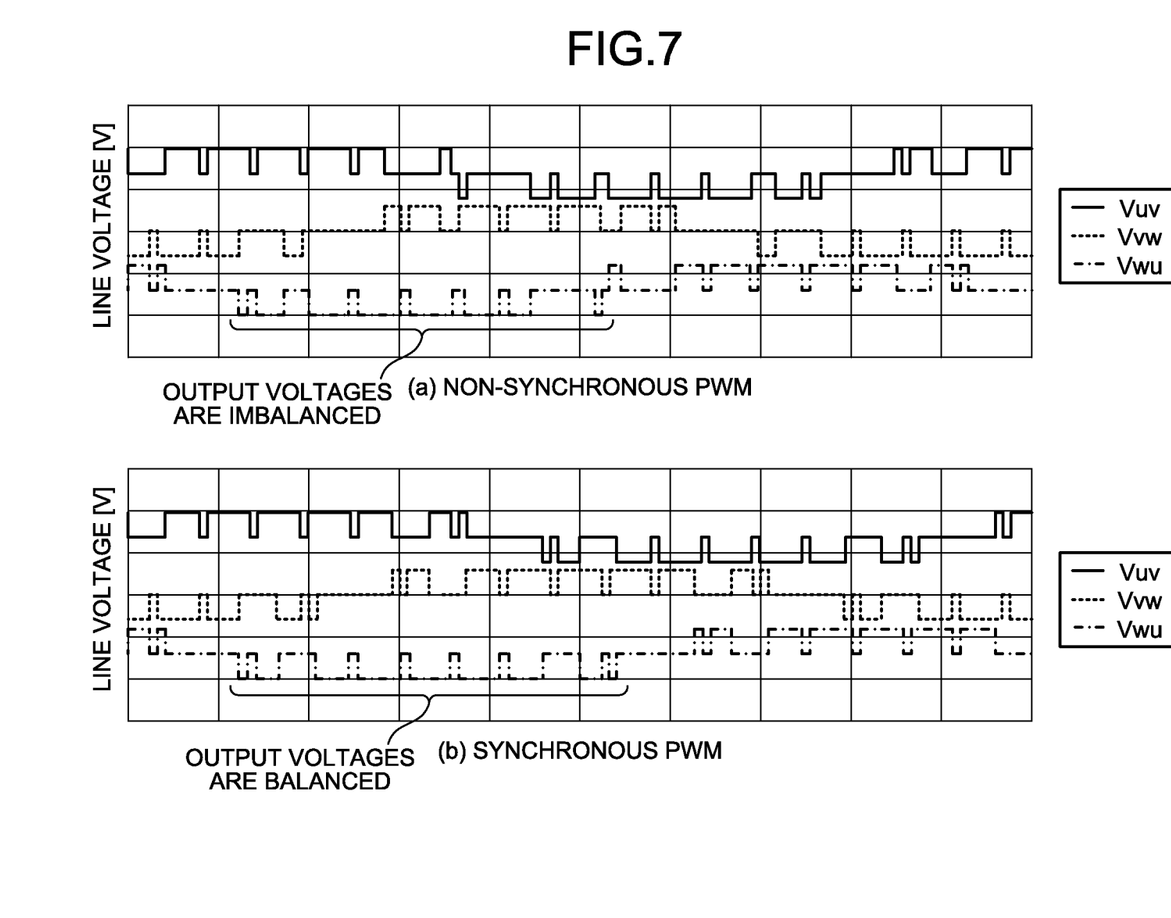
FIG. 7 illustrates charts for comparing line voltages in a case of non-synchronous PWM with line voltages in a case of synchronous PWM.

FIG. 7 illustrates charts comparing line voltages in a case of non-synchronous PWM with line voltages in a case of synchronous PWM, in which FIG. 7 (a) illustrates line voltages in the case of non-synchronous PWM where there is no relation of an integer multiple between the voltage commands and the carrier, and the voltage command Vu* and the carrier are not synchronous with each other, and FIG. 7 (b) illustrates line voltages in the case of synchronous PWM where there is a relation of an integer multiple between the voltage commands and the carrier, and control is performed so that the voltage command Vu* and the carrier are synchronous with each other.

While output voltages in the non-synchronous PWM are asymmetric as illustrated in FIG. 7 (a) and are thus imbalanced, output voltages in the synchronous PWM are symmetric as illustrated in FIG. 7 (b) and are thus balanced.

Figure 8:
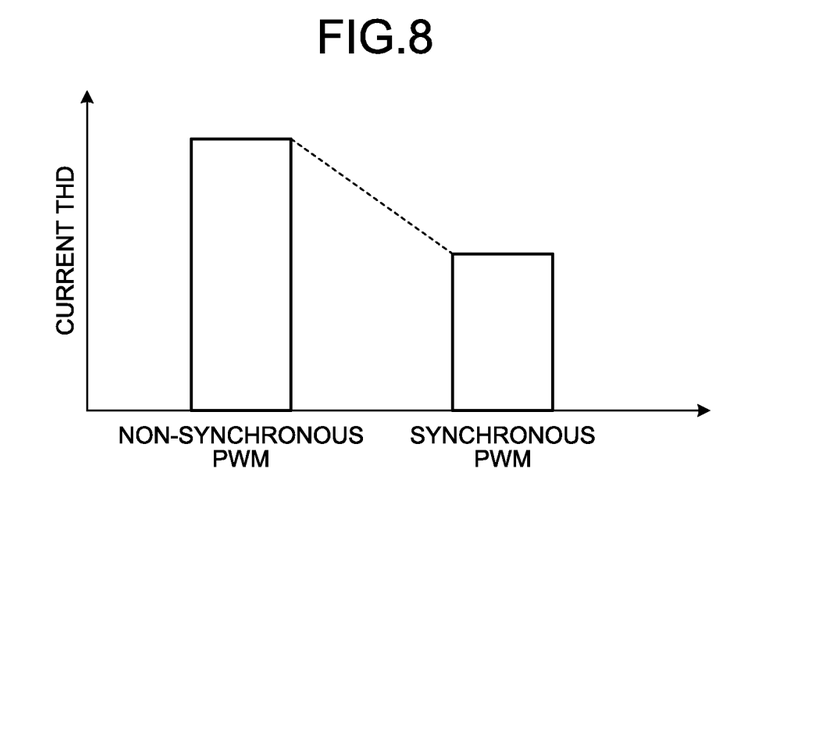
FIG. 8 is a graphs comparing current THD in the case of the non-synchronous PWM with that in the case of the synchronous PWM.

FIG. 8 is a graph illustrating comparison between total harmonic distortion of the motor current (hereinafter referred to as "current THD" in the case of the non-synchronous PWM and that in the case of the synchronous PWM. Because the imbalance of the voltages applied to the motor 3 is reduced in the synchronous PWM, the current THD in the synchronous PWM is smaller than that in the non-synchronous PWM as illustrated in FIG. 8. As a result, in the case of the synchronous PWM, torque pulsation caused by current distortion is reduced, which reduces occurrence of vibration and noise due to pulsation of the rotation speed of the motor 3.

In the case of the non-synchronous PWM, the distortion of the output voltages can be reduced when the carrier frequency is sufficiently higher than the frequency of the voltage commands, but reduction in the distortion of the output voltages is difficult when the carrier frequency is lower than the frequency of the voltage commands. In contrast, in the case of the synchronous PWM, as described above, it is possible to reduce current pulsation even when the carrier frequency is lower than the frequency of the voltage commands. Thus, the synchronous PWM according to the present embodiment enables the motor 3 to be stably driven even in a state in which the carrier frequency is lower than that in the non-synchronous PWM of the related art.

Figure 9:
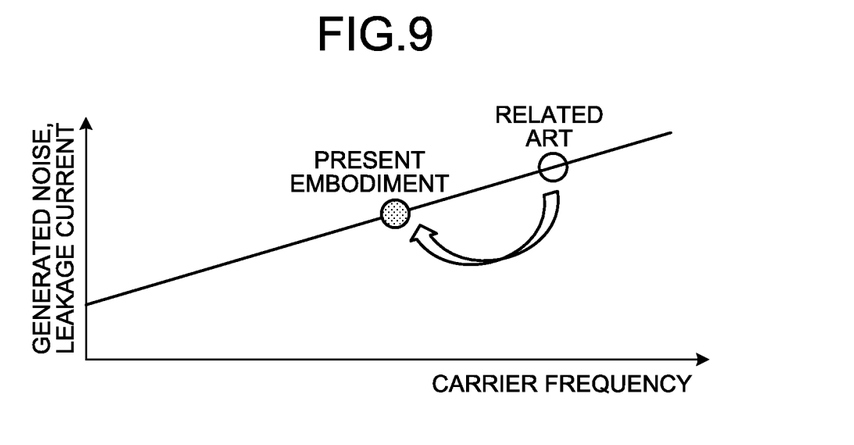
FIG. 9 is a graph comparing carrier frequency, and generated noise and leakage current with those in related art.

FIG. 9 is a graph comparing the carrier frequency, and generated noise and leakage current with those in the related art. When the carrier frequency is lowered, the number of times the switching elements 5a to 5f are switched is reduced, which reduces noise generated in the inverter 2 and current leaking from the motor 3 as compared with those in the related art as illustrated in FIG. 9.

In the non-synchronous PWM, however, when the value of the frequency of the carrier becomes close to the frequency of a voltage command, the current THD tends to increase, and thus, the carrier frequency is typically set to be ten times the frequency of the voltage command or larger, which is also a requirement. In contrast, in the synchronous PWM, the increase in the current THD is suppressed even when the carrier frequency is three times the frequency of a voltage command, which enables the amount of generated noise and the amount of leakage current to be reduced. In addition, when the carrier frequency is lowered, the number of times of switching is reduced, and the loss caused by switching of the switching elements 5a to 5f can thus be kept low, which also contributes to higher efficiency of the inverter 2.

As described above, in the motor driver according to the present embodiment, the inverter included in the motor driver: drives, during start operation, a switching element with a first PWM signal being PWM modulated with a carrier frequency as a first integer multiple of the frequency of alternating-current voltage; and thereafter drives the switching element with a second PWM signal being PWM modulated with a carrier frequency as a second integer multiple of the frequency of the alternating-current voltage, where the second integer is smaller than the first integer. This enables, even in the state in which the carrier frequency is lowered, both of more stable driving of the motor with reduced noise and vibration, and lower noise resulting from the lowered carrier frequency.

Note that at startup or during start operation refers to a period when a device is started until the operation of the device is stabilized. In an example of a heat pump system, which will be described later, this period is a period until refrigerant is stabilized. Stabilization of refrigerant refers to a state in which the difference between the suction pressure and the discharge pressure of the refrigerant exceeds a threshold. A point when noise or leakage current settles down may be, in other words, a point when refrigerant is stabilized.

In recent years, as an approach to improve the space factor of wire wound around slots of a stator in order to increase the efficiency of the motor 3, a thin material such as polyethylene terephthalate film (hereinafter abbreviated as a "PET film") is used as an insulating material. The PET film has a larger capacitance than insulating materials of related art, and tends to increase the leakage current. As a result of reducing the carrier frequency by using the technology of the present embodiment, however, noise and leakage current are reduced even when the PET film is used, and measures against noise and leakage current can be taken without mounting of a special external device, which produces advantageous effects of not only reducing costs but also improving the wire space factor, and increasing the efficiency of driving the motor.

As the switching elements 5a to 5f and the diodes 6a to 6f included in the inverter 2, elements made of silicon (Si) (hereinafter referred to as "Si elements") are typically used, however elements made of silicon carbide (SiC), gallium nitride (GaN), diamond and the like, which are wide band gap semiconductors enabling high-voltage and high-temperature operation, may alternatively be used.

Note that the switching elements 5a to 5f made of wide band gap semiconductors have a high switching speed and a high rate of change in voltage with time dV/dt, which is a problem in that the amount of generated noise is high. With the synchronous PWM presented in the present embodiment, however, a low carrier frequency can be set, which produces an effect of reducing generation of noise.

Furthermore, because the loss is smaller with the wide band gap semiconductor than with Si, an advantageous effect of further reducing the loss is produced in addition to higher efficiency of the inverter 2 resulting from reduction in the number of times of switching according to the synchronous PWM.

Moreover, although return current or regeneration current flows through the diodes 6a to 6f at a timing (a dead time, for example) when the switching operations of the switching elements 5a to 5f are turned off while the motor 3 is driven by the inverter 2, the diodes 6a to 6f made of wide band gap semiconductors have lower loss than those of Si, which produces an advantageous effect of reducing the loss of the inverter 2 in operation during which return current or regeneration current flows.

Alternatively, metal-oxide-semiconductor field-effect transistors (MOSFETs) having a super junction structure known as efficient switching elements may be used. In this case, the above-described effects can be achieved by using the wide band gap semiconductor or the MOSFET having the super junction structure for any one of the switching elements 5a to 5f and the diodes 6a to 6f of the inverter 2.

Note that the inverter controlling unit 4 can be implemented by a central processing unit (CPU), a digital signal processor (DSP), or a discrete system of a microcomputer, or may alternatively be implemented by an electrical circuit element such as an analog circuit or a digital circuit.

Figure 10:
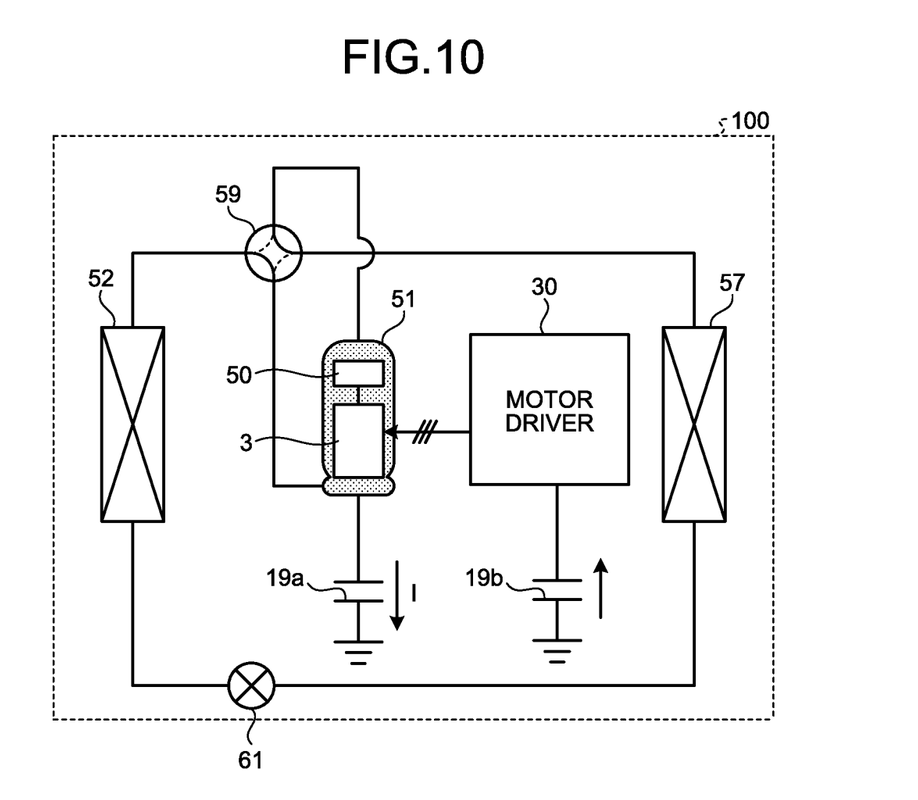
FIG. 10 is a schematic configuration diagram of the motor driver according to the present embodiment applied to a heat pump system.

Next, an example of application of the motor driver 30 according to the present embodiment will be described. FIG. 10 is a schematic configuration diagram of the motor driver according to the present embodiment applied to a heat pump system. The heat pump system 100 illustrated in FIG. 10 includes a compressor 51 including the motor 3 and a compression mechanism 50, a four-way valve 59, a heat exchanger 52, an expansion mechanism 61, and a heat exchanger 57, which are sequentially connected via pipes. Hereinafter, the heat pump system 100 will be described in more detail.

Figure 11:
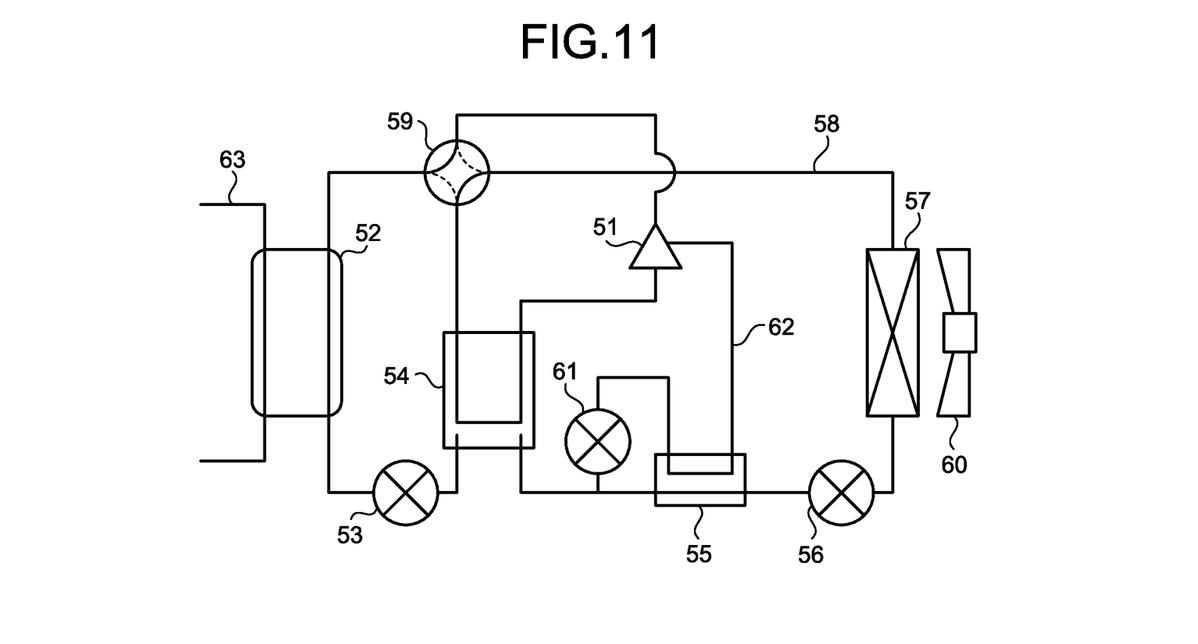
FIG. 11 is a circuit configuration diagram of the heat pump system according to the present embodiment.
Figure 12:
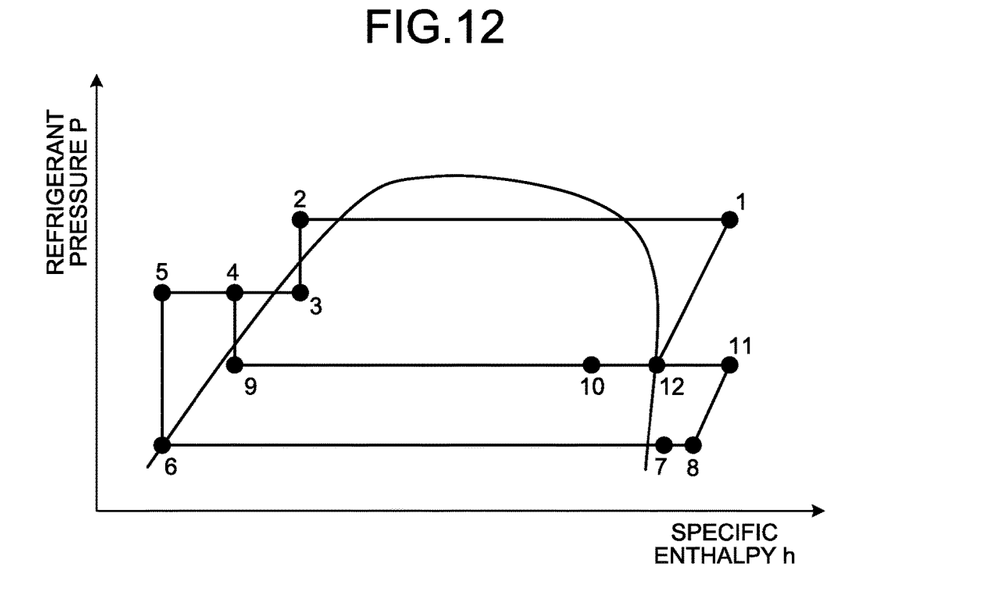
FIG. 12 is a Mollier diagram of the state of refrigerant in the heat pump system illustrated in FIG. 11.

FIG. 11 is a circuit configuration diagram of the heat pump system 100 according to the present embodiment, and FIG. 12 is a Mollier diagram of the state of refrigerant in the heat pump system 100 illustrated in FIG. 11. In FIG. 12, the horizontal axis represents specific enthalpy, and the vertical axis represents refrigerant pressure.

The heat pump system 100 includes a main refrigerant circuit 58 in which the compressor 51, the heat exchanger 52, an expansion mechanism 53, a receiver 54, an internal heat exchanger 55, an expansion mechanism 56, and the heat exchanger 57 are sequentially connected via pipes. Refrigerant circulates in the main refrigerant circuit 58. Note that the four-way valve 59 is provided on a discharge side of the compressor 51 in the main refrigerant circuit 58, enabling switching of the circulating direction of the refrigerant. In addition, a fan 60 is provided near the heat exchanger 57. The heat pump system 100 also includes an injection circuit 62 that connects from between the receiver 54 and the internal heat exchanger 55 to an injection pipe of the compressor 51 via pipes. The expansion mechanism 61 and the internal heat exchanger 55 are sequentially connected with the injection circuit 62.

A water circuit 63 through which water circulates is connected with the heat exchanger 52. Note that devices that use water, such as a water heater, a radiator, and a radiator or the like for floor heating or the like, are connected with the water circuit 63.

First, operation of the heat pump system 100 during heating operation will be described. During heating operation, the four-way valve 59 is set in the direction of the solid lines. Note that the heating operation includes not only heating used for air conditioning but also hot water supply that heats water to make hot water.

Gas-phase refrigerant (point 1 in FIG. 12) that is increased in temperature and pressure in the compressor 51 is discharged from the compressor 51, subjected to heat exchanged by the heat exchanger 52 that is a condenser and serves as a radiator, and thus liquefied (point 2 in FIG. 12). In this process, the water circulating through the water circuit 63 is heated by heat radiated from the refrigerant, and used for heating and hot water supply.

The liquid-phase refrigerant resulting from the liquefaction in the heat exchanger 52 is reduced in pressure by the expansion mechanism 53, and thus changed into a gas-liquid two-phase state (point 3 in FIG. 12). The refrigerant changed into the gas-liquid two-phase state by the expansion mechanism 53 is subjected to heat exchange at the receiver 54 with refrigerant sucked into the compressor 51, and thus cooled and liquefied (point 4 in FIG. 12). The liquid-phase refrigerant resulting from the liquefaction in the receiver 54 is branched into a flow through the main refrigerant circuit 58 and a flow through the injection circuit 62.

The liquid-phase refrigerant flowing through the main refrigerant circuit 58 is reduced in pressure by the expansion mechanism 61, and subjected to heat exchange at the internal heat exchanger 55 with the refrigerant changed into the gas-liquid two-phase state and flowing through the injection circuit 62, and thus further cooled (point 5 in FIG. 12). The liquid-phase refrigerant resulting from the cooling in the internal heat exchanger 55 is reduced in pressure by the expansion mechanism 56, and thus changed into a gas-liquid two-phase state (point 6 in FIG. 12). The refrigerant changed into the gas-liquid two-phase state by the expansion mechanism 56 is subjected to heat exchange with outside air at the heat exchanger 57 that serves as an evaporator, and thus heated (point 7 in FIG. 12). The refrigerant heated by the heat exchanger 57 is then further heated at the receiver 54 (point 8 in FIG. 12), and sucked into the compressor 51.

Meanwhile, the refrigerant flowing through the injection circuit 62 is reduced in pressure by the expansion mechanism 61 (point 9 in FIG. 12), and subjected to heat exchange at the internal heat exchanger 55 (point 10 in FIG. 12) as described above. The refrigerant (injection refrigerant) in the gas-liquid two-phase state resulting from the heat exchange at the internal heat exchanger 55 flows in the gas-liquid two-phase state into the compressor 51 through the injection pipe of the compressor 51.

In the compressor 51, the refrigerant sucked from the main refrigerant circuit 58 (point 8 in FIG. 12) is compressed to an intermediate pressure and heated (point 11 in FIG. 12). The refrigerant compressed to the intermediate pressure and heated (point 11 in FIG. 12) is merged with the injection refrigerant (point 10 in FIG. 12), and is thus decreased in temperature (point 12 in FIG. 12). The refrigerant decreased in temperature (point 12 in FIG. 12) is then further compressed and heated to high temperature and high pressure, and discharged (point 1 in FIG. 12).

Note that, when the injection operation is not performed, the opening degree of the expansion mechanism 61 is set to be fully closed. In other words, while the opening degree of the expansion mechanism 61 is larger than a predetermined opening degree when the injection operation is performed, the opening degree of the expansion mechanism 61 is set to be smaller than the predetermined opening degree when the injection operation is not performed. The refrigerant thus does not flow into the injection pipe of the compressor 51. Note that the opening degree of the expansion mechanism 61 is electronically controlled by a control unit of a microcomputer or the like.

Next, operation of the heat pump system 100 during cooling operation will be described. During cooling operation, the four-way valve 59 is set in the direction of the broken lines. Note that the cooling operation includes not only cooling used for air conditioning but also conducting heat away from water to make cold water, refrigeration, and the like.

The gas-phase refrigerant that is increased in temperature and pressure in the compressor 51 (point 1 in FIG. 12) is discharged from the compressor 51, subjected to heat exchange by the heat exchanger 57 that is a condenser and serves as a radiator, and thus liquefied (point 2 in FIG. 12). The liquid-phase refrigerant resulting from the liquefaction in the heat exchanger 57 is reduced in pressure by the expansion mechanism 56, and thus changed into a gas-liquid two-phase state (point 3 in FIG. 12). The refrigerant changed into the gas-liquid two-phase state by the expansion mechanism 56 is subjected to heat exchange in the internal heat exchanger 55, and thus cooled and liquefied (point 4 in FIG. 12). In the internal heat exchanger 55, heat exchange is carried out between the refrigerant changed into the gas-liquid two-phase state by the expansion mechanism 56 and the refrigerant changed into the gas-liquid two-phase state (point 9 in FIG. 12) resulting from the reduction in pressure, by the expansion mechanism 61, of the liquid-phase refrigerant resulting from the liquefaction in the internal heat exchanger 55. The liquid-phase refrigerant (point 4 in FIG. 12) resulting from the heat exchange in the internal heat exchanger 55 is branched into a flow through the main refrigerant circuit 58 and a flow through the injection circuit 62.

The liquid-phase refrigerant flowing through the main refrigerant circuit 58 is subjected to heat exchange at the receiver 54 with the refrigerant sucked into the compressor 51, and thus further cooled (point 5 in FIG. 12). The liquid-phase refrigerant resulting from the cooling in the receiver 54 is reduced in pressure by the expansion mechanism 53, and thus changed into the gas-liquid two-phase state (point 6 in FIG. 12). The refrigerant changed into the gas-liquid two-phase state by the expansion mechanism 53 is subjected to heat exchange at the heat exchanger 52 that serves as an evaporator, and is thus heated (point 7 in FIG. 12). In this process, the refrigerant absorbs heat to cool the water circulating through the water circuit 63, which is used for cooling, refrigeration, and the like. The refrigerant heated by the heat exchanger 52 is further heated in the receiver 54 (point 8 in FIG. 12), and sucked into the compressor 51.

Meanwhile, the refrigerant flowing through the injection circuit 62 is reduced in pressure by the expansion mechanism 61 (point 9 in FIG. 12), and subjected to heat exchange at the internal heat exchanger 55 (point 10 in FIG. 12) as described above. The refrigerant (injection refrigerant) in the gas-liquid two-phase state resulting from the heat exchange in the internal heat exchanger 55 flows in the gas-liquid two-phase state into the compressor 51 through the injection pipe. The compressing operation in the compressor 51 is similar to that during heating operation.

Note that, when the injection operation is not performed, the opening degree of the expansion mechanism 61 is set to be fully closed, so that the refrigerant does not flow into the injection pipe of the compressor 51, similarly to the heating operation.

In the description above, the heat exchanger 52 is explained as being such a heat exchanger as a plate type heat exchanger that provides heat exchange between the refrigerant and the water circulating through the water circuit 63. The heat exchanger 52 is not limited thereto, and may conduct heat exchange between the refrigerant and air. In addition, the water circuit 63 may be a circuit through which another fluid circulates instead of the circuit through which water circulates.

As described above, in the heat pump system 100, because the refrigerant circulates in the compressor 51 and the motor 3 is built in the compressor 51, stray capacitance 19a illustrated in FIG. 10 changes depending on the condition of the refrigerant. In particular, when the operation of the heat pump system 100 is stopped, the refrigerant may be liquefied and remain inside the compressor 51, and particularly when the liquid refrigerant has increased to such a degree that the motor in the compressor 51 is soaked, the capacitance between the motor 3 and the compressor 51 changes, the stray capacitance 19a in FIG. 10 thus becomes greater, and noise and leakage current I generated when the inverter 2 operates become great, which may have an adverse effect on the entire motor driver 30 via the ground (earth) or the like. In addition, increased leakage current may cause a worker or the like to get an electric shock when touching the heat pump system 100. In addition, stray capacitance 19b is also present between the motor driver 30 and the ground (earth), which leads to an increase in noise.

Thus, the synchronous PWM described in the present embodiment is applied at startup of the motor 3 in the compressor 51. In such a case where the startup frequency is 10 Hz relative to several kHz that is typically used as carrier frequency, for example, and there is a relation of the carrier frequency being nine times a frequency of the voltage command, application of the synchronous PWM according to the present embodiment enables the carrier frequency to be greatly reduced to 90 Hz, which enables noise and leakage current to be reduced while the refrigerant in the compressor 51 at the startup is not stable.

Note, however, that an extremely low carrier frequency can coincide with the resonance frequency of pipes for refrigerant in the heat pump system 100 and cause breakage of a pipe due to pipe vibration, low-frequency noise, and the like, and the carrier frequency is thus preferably set to a value lower than the typically used carrier frequency in view of noise and leakage current.

Figure 13:
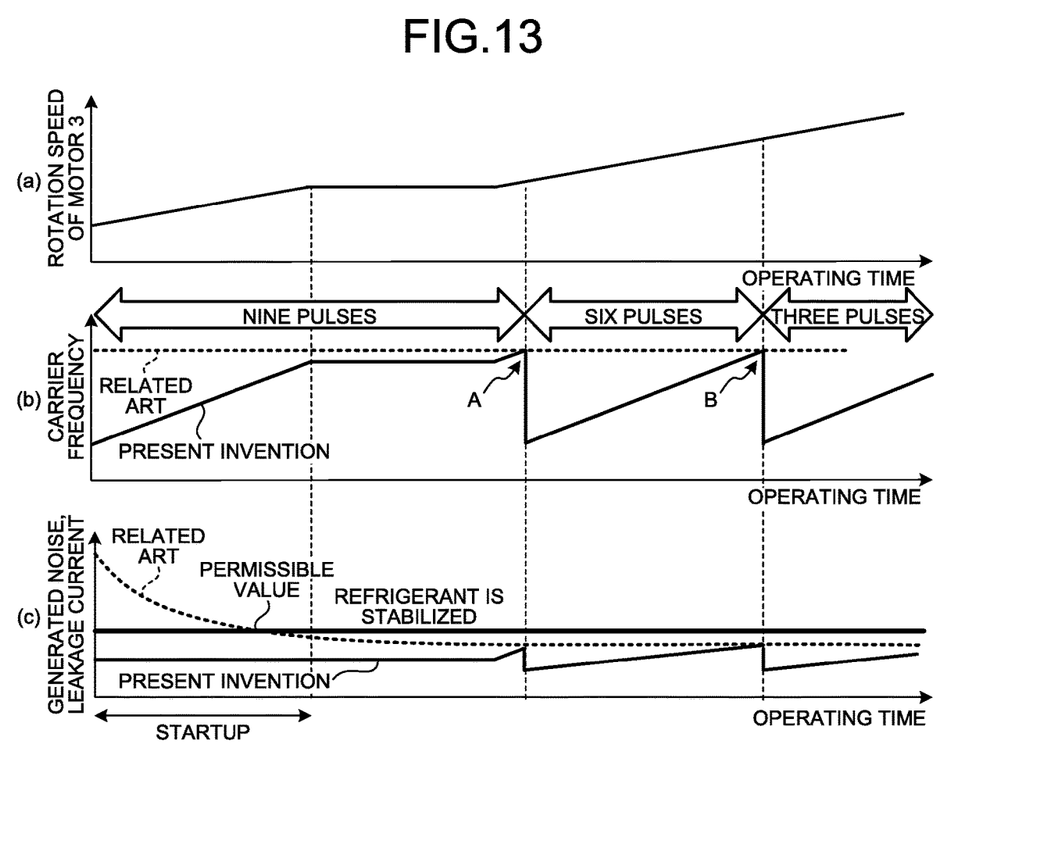
FIG. 13 is a timing chart illustrating a change in carrier frequency in a case where a control technique according to the present embodiment is applied to the heat pump system illustrated in FIG. 11.

FIG. 13 is a timing chart illustrating a change in the carrier frequency in a case where the control technique according to the present embodiment is applied to the heat pump system illustrated in FIG. 11, in which FIG. 13 (a) illustrates a change in the rotation speed of the motor 3, FIG. 13 (b) illustrates a change in the carrier frequency with respect to the rotation speed of the motor in comparison with that in the related art, and FIG. 13 (c) illustrates generated noise and leakage current in comparison with the related art.

As illustrated in FIG. 13 (b) and FIG. 13 (c), during startup when the refrigerant is not stable, the carrier frequency is gradually increased with the rotation speed of the motor 3, so that noise and leakage current are prevented from exceeding a permissible value at startup as compared with the case of the related art where the carrier frequency is constant. In this case, the slope of the rotation speed of the motor 3 is preferably determined within a range in which noise and leakage current do not exceeds the permissible value in view of the refrigerant stabilization time and the like.

In addition, in a case where the carrier frequency is nine times the frequency of the voltage command, that is, in a case where nine-pulse operation is performed, the carrier frequency is 990 Hz when the frequency of the voltage command is 110 Hz. As the rotation speed of the motor 3 is increased from this state, the frequency of the voltage command increases, and if the carrier frequency in the related art is assumed to be 1 kHz, the frequency of the voltage command may exceed this value, and generated noise and leakage current may increase. Thus, as illustrated in FIG. 13, in such a case where the frequency of the voltage command exceeds the carrier frequency in the related art (point A in FIG. 13), the carrier frequency is reduced to ⅔ so that the carrier frequency is set to be six times the frequency of the voltage command, that is, six-pulse operation is performed. Reduction of the carrier frequency to ⅔ enables reduction of generated noise and leakage current. When the rotation speed of the motor 3 is further increased (point B in FIG. 13), control is performed so that the carrier frequency is set to be three times the frequency of the voltage command, which enables operation with the carrier frequency being not higher than that in the related art and reduces generated noise and leakage current from startup until normal operation.

While switching of operation between nine pulses, six pulses, and three pulses is described above, needless to say, control may be performed using the number of pulses over nine pulses (for example, 21 pulses, 15 pulses, or 12 pulses). In this case, it is essential to switch the number of pulses so that the ratio of 3n (an integer multiple if two-phase modulation is also employed) is maintained between the frequency of the voltage command and the carrier frequency. In addition, when the rotation speed of the motor 3 is increased during a period during which the same number of pulses are output, it is essential to increase the frequency of the voltage command and the carrier frequency in such a manner than the ratio of the integer multiple between the frequency of the voltage command and the carrier frequency is maintained. The above-described control operation produces the advantageous effects described above. Needless to say, although the relation of the integer multiple may be instantaneously lost owing to fluctuation or the like, such a case is also deemed to be the relation of the integer multiple.

In addition, the annual performance factor (APF) has been used as power saving indicator for the heat pump system 100 in recent years, and there have been demands for improving the efficiency under intermediate conditions including low-speed operation and light-load operation rather than rated operation. Thus, application of the synchronous PWM described in the present embodiment to the intermediate conditions: reduces the number of time of switching of the switching elements 5a to 5f of the inverter 2; reduces the switching loss; resolves distortion of current flowing through the motor 3 as a result of the reduction in the carrier frequency, which reduces high-frequency iron loss occurring in the motor 3; and improves the efficiency. In addition, generated noise and leakage current are reduced, which decreases the cost of components for improvement, and thus decreases the overall cost.

Figure 14:
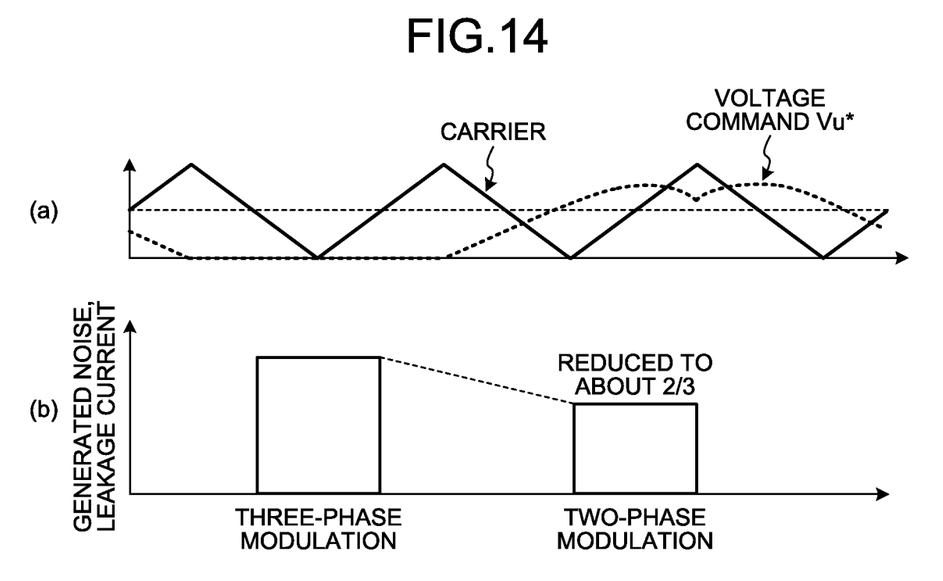
FIG. 14 illustrates graphs comparing generated noise and leakage current between three-phase modulation and two-phase modulation.

Furthermore, the two-phase modulation as illustrated in FIG. 14 may be performed instead of three-phase modulation that is a voltage command illustrated in FIG. 3 and FIG. 5. FIG. 14 illustrates graphs comparing generated noise and leakage current between three-phase modulation and two-phase modulation. In FIG. 14 (a), a carrier is expressed by a solid line, and a voltage command Vu* generated by two-phase modulation is expressed by a thick broken line. Control of the switching elements 5a to 5f by generating the voltage command Vu* by the two-phase modulation as illustrated in FIG. 14 (a) enables the number of times of switching the switching elements 5a to 5f to be reduced to ⅔ while producing the same output voltage as that in the three-phase modulation. Since the number of times of switching is reduced to ⅔, the switching loss of the inverter 2 becomes about ⅔ as a natural consequence, but it is known that generated noise and leakage current are also reduced to about ⅔ in the heat pump system 100 as illustrated in FIG. 14 (b). Thus, employment of both of the synchronous PWM in which the frequency of the voltage command and the carrier frequency are controlled to have a relation of an integer multiple therebetween and the two-phase modulation enables further increase in efficiency and also reduces generation of noise and leakage current.

For the purpose of reducing cost in the motor driver 30 of the heat pump system 100 in recent years, there is a technology of providing the current detector 8 in FIG. 1 with a shunt resistor, instead of a conventional current transformer, to detect current flowing through the motor 3 at the switching timing of the switching elements 5a to 5f of the inverter 2.

In this case, Patent Literature 2 mentioned above teaches that the detection can be facilitated by lowering the carrier frequency and widening the current flow width. In the case of the non-synchronous PWM, however, when the carrier frequency is reduced, the imbalance of the output voltage occurs and the current flowing through the motor 3 is distorted, and it is therefore unlikely that the problem of difficulty in stable operation can be solved.

Figure 15:
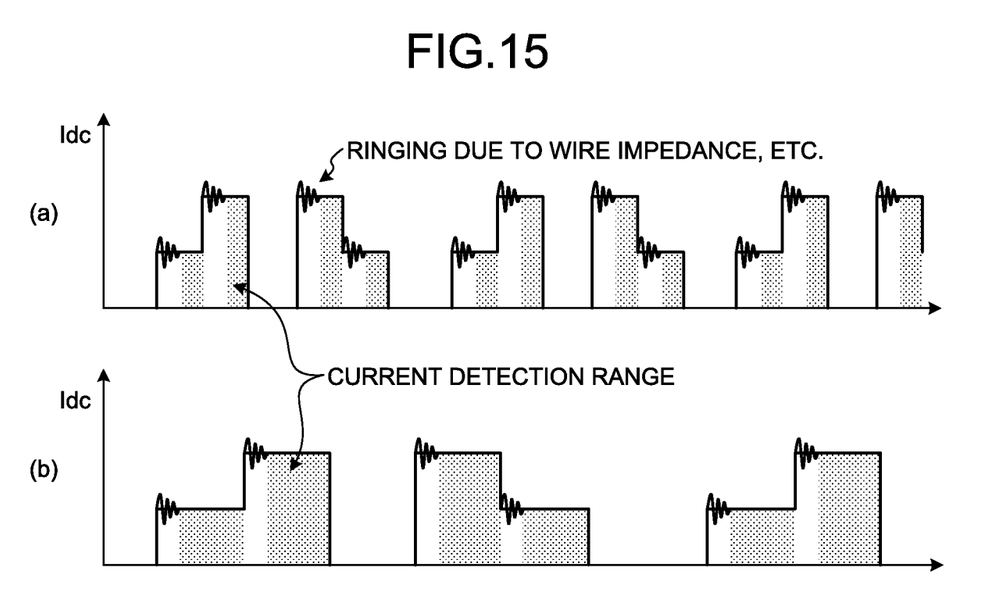
FIG. 15 illustrates graphs comparing direct-current current detection ranges depending on the magnitude of the carrier frequency.

In contrast, according to the technology proposed in the present embodiment, the carrier frequency can be lowered to about three times an operation frequency as compared with the related art in which a carrier frequency of ten times an operation frequency is used in the non-synchronous PWM. FIG. 15 illustrates graphs comparing direct-current current detection ranges depending on the magnitude of the carrier frequency, in which FIG. 15 (a) is a graph illustrating a current detection range when the carrier frequency high, and FIG. 15 (b) is a graph illustrating a current detection range when the carrier frequency is low. Note that current can be detected by the shunt resistor within a period indicated by hatching during which there is no influence of ringing due to wire impedance or the like, and this period is defined as the current detection range.

According to the technology proposed in the present embodiment, the current flow width is further widened and detection of current is facilitated as is clear from the comparison between FIG. 15 (a) and FIG. 15 (b). Furthermore, in addition to the facilitation of current detection, detection of current in a state in which distortion of current is reduced is achieved, which enables stable driving of the motor 3.

Furthermore, in recent years, a single rotary compressor is widely used for the purpose of reducing the cost for the compressor 51. In the single rotary compressor, load torque pulsation synchronous with the rotation angle per one turn is generated. Thus, because the rotation speed becomes lower at a rotation angle with a large load torque, and the rotation speed increases at a rotation angle with a small load torque, vibration due to pulsation of the rotation speed of the motor 3 in the compressor 51 is transmitted to pipes and the like in the heat pump system 100, which may cause leakage of refrigerant due to breakage of a pipe or the like.

As a measure against such a problem, a technology of reducing pulsation of the rotation speed and reducing vibration by increasing or decreasing rotation speed commands or torque commands by feedforward control or feedback control depending on the load torque synchronous with the rotation angle is proposed. When the synchronous PWM is employed, however, a change in rotation speed command cannot be followed and the current waveform may be distorted, which may lead to halt due to overcurrent of the inverter 2 and step-out of the motor 3. Thus, in a case where the rotation speed command or the torque command changes, the carrier frequency can be corrected in advance in view of the amount of the change to reduce the current distortion.

In addition, when the current flowing through the motor 3 in the compressor 51 is pulsed, there is a problem in that loss due to the coil resistance of the motor 3 is great when the current is high. As a measure against this problem, a technology of increasing or decreasing a rotation speed command for the motor 3 depending on the current pulsation to reduce the current pulsation and thus increase the efficiency of the motor 3 is proposed. In this case, because the rotation speed of the motor 3 constantly changes, it is difficult to synchronize the carrier frequency with the change of the rotation speed when the synchronous PWM is employed, and the current waveform may be distorted when the relation of the integer multiple is lost, which may lead to halt due to overcurrent of the inverter 2 and step-out of the motor 3. Thus, a target carrier frequency can be corrected in view of the amount of the change in the rotation speed command, so that the carrier frequency is also reliably synchronized with the change of the rotation speed, which reduces the current distortion.

In a case where the rotation speed of the motor 3 is changed by the current pulsation, the carrier frequency can be corrected, which suppresses the change of the rotation speed due to the current pulsation and enables the rotation speed of the motor 3 to be reduced to be constant.

In a case where the rotation speed of the motor 3 is changed by current pulsation, the voltage output from the inverter 2 can be controlled so that the peak value of the current flowing through the motor 3 becomes constant, which also suppresses the change of the rotation speed due to the current pulsation, which enables the rotation speed of the motor 3 to be reduced to be constant.

As described above, the heat pump system 100 can be used for heat pump systems including an inverter compressor, such as an air conditioner, a heat pump water heater, a refrigerator, and a refrigeration machine.

Note that the configurations presented in the embodiment above are examples of the present invention, and can be combined with other known technologies or can be partly omitted or modified without departing from the scope of the present invention.

The invention claimed is:

1. A motor driving device comprising:
an inverter used for driving a motor and configured to apply an alternating-current voltage to the motor, wherein
the inverter drives, during start operation, a switching element of the inverter with a first PWM signal that is PWM modulated with a carrier frequency that is a first integer multiple of a frequency of the alternating-current voltage, and thereafter drives the switching element with a second PWM signal that is PWM modulated with a carrier frequency that is a second integer multiple of the frequency of the alternating-current voltage, the second integer being smaller than the first integer, and
voltage output by the inverter is controlled so that rotation speed of the motor is constant while current flowing through the motor is pulsed.

2. A motor driving device comprising:
an inverter used for driving a motor and configured to apply an alternating-current voltage to the motor, wherein
the inverter drives, during start operation, a switching element of the inverter with a first PWM signal that is PWM modulated with a carrier frequency that is a first integer multiple of a frequency of the alternating-current voltage, and thereafter drives the switching element with a second PWM signal that is PWM modulated with a carrier frequency that is a second integer multiple of the frequency of the alternating-current voltage, the second integer being smaller than the first integer, and
voltage output by the inverter is controlled so that a peak value of current flowing through the motor is constant while the current flowing through the motor is pulsed.

3. A motor driving device comprising:
an inverter used for driving a motor and configured to apply an alternating-current voltage to the motor, wherein
the inverter drives, during start operation, a switching element of the inverter with a first PWM signal that is PWM modulated with a carrier frequency that is a first integer multiple of a frequency of the alternating-current voltage, and thereafter drives the switching element with a second PWM signal that is PWM modulated with a carrier frequency that is a second integer multiple of the frequency of the alternating-current voltage, the second integer being smaller than the first integer, and
voltage output by the inverter is controlled so that a peak value of current flowing through the motor is constant while rotation speed of the motor changes.

4. The motor driver according to claim 1, wherein the carrier frequency of the first integer multiple and the carrier frequency of the second integer multiple of the frequency of the alternating-current voltage are 3n times (n is an integer) the frequency of the alternating-current voltage.

5. The motor driver according to claim 2, wherein the carrier frequency of the first integer multiple and the carrier frequency of the second integer multiple of the frequency of the alternating-current voltage are 3n times (n is an integer) the frequency of the alternating-current voltage.

6. The motor driver according to claim 3, wherein the carrier frequency of the first integer multiple and the carrier frequency of the second integer multiple of the frequency of the alternating-current voltage are 3n times (n is an integer) the frequency of the alternating-current voltage.

7. The motor driver according to claim 1, wherein the first and second PWM signals are PWM signals generated by two-phase modulation.

8. The motor driver according to claim 2, wherein the first and second PWM signals are PWM signals generated by two-phase modulation.

9. The motor driver according to claim 3, wherein the first and second PWM signals are PWM signals generated by two-phase modulation.

10. The motor driver according to claim 1, wherein the inverter includes a current detector including a shunt resistor that detects current input to the inverter.

11. The motor driver according to claim 2, wherein the inverter includes a current detector including a shunt resistor that detects current input to the inverter.

12. The motor driver according to claim 3, wherein the inverter includes a current detector including a shunt resistor that detects current input to the inverter.

13. The motor driver according to claim 1, wherein at least one of switching elements is made of a wide band gap semiconductor.

14. The motor driver according to claim 2, wherein at least one of switching elements is made of a wide band gap semiconductor.

15. The motor driver according to claim 3, wherein at least one of switching elements is made of a wide band gap semiconductor.

16. The motor driver according to claim 1, wherein a PET film is used for insulation of the motor.

17. The motor driver according to claim 2, wherein a PET film is used for insulation of the motor.

18. The motor driver according to claim 3, wherein a PET film is used for insulation of the motor.

19. A heat pump system comprising the motor driver according to claim 1.

20. A heat pump system comprising the motor driver according to claim 2.

21. A heat pump system comprising the motor driver according to claim 3.

22. Refrigeration and air conditioning equipment comprising the motor driver according to claim 1.

23. Refrigeration and air conditioning equipment comprising the motor driver according to claim 2.

24. Refrigeration and air conditioning equipment comprising the motor driver according to claim 3.

* * * * *